US010812782B2

(12) United States Patent
Chang et al.

(10) Patent No.: US 10,812,782 B2
(45) Date of Patent: Oct. 20, 2020

(54) OBSTACLE WARNING APPARATUS FOR VEHICLE

(71) Applicant: Ability Opto-Electronics Technology Co. Ltd., Taichung (TW)

(72) Inventors: Yeong-Ming Chang, Taichung (TW); Chien-Hsun Lai, Taichung (TW); Yi-Chi Cheng, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 29 days.

(21) Appl. No.: 16/160,282

(22) Filed: Oct. 15, 2018

(65) Prior Publication Data

US 2019/0253696 A1    Aug. 15, 2019

Related U.S. Application Data

(60) Provisional application No. 62/630,276, filed on Feb. 14, 2018.

(51) Int. Cl.
*H04N 13/282*    (2018.01)
*H04N 13/243*    (2018.01)
(Continued)

(52) U.S. Cl.
CPC .......... *H04N 13/282* (2018.05); *B60Q 9/008* (2013.01); *B60R 1/00* (2013.01); *G06T 7/521* (2017.01);
(Continued)

(58) Field of Classification Search
CPC .. H04N 13/282; H04N 13/243; H04N 13/275; G06T 7/521; G06T 2207/30261;
(Continued)

(56) References Cited

U.S. PATENT DOCUMENTS 7,298,247 B2 * 11/2007 Shimizu .................. G01S 15/86
340/435
7,741,961 B1 * 6/2010 Rafii ...................... B60Q 9/005
340/435
(Continued)

FOREIGN PATENT DOCUMENTS

CN    101934771 A    1/2011
CN    102271966 A    12/2011
(Continued)

*Primary Examiner* — James M Pontius
(74) *Attorney, Agent, or Firm* — Wang Law Firm, Inc.

(57) ABSTRACT

An obstacle warning apparatus for vehicle is provided. The obstacle warning apparatus includes at least one camera module, a surround-view processor, an obstacle processor and an image synthesizer. Each camera module includes a projector for projecting structured infrared light to the region of interest outside of the vehicle, and a receiver for receiving first images and second images generated by visible light and structured infrared light both reflected from the region of interest, respectively. The surround-view processor generates surround-view data according to the first images. The obstacle processor generates obstacle data according to the second images. The image synthesizer generates the synthesized image according to the surround-view data and the obstacle data.

25 Claims, 13 Drawing Sheets

(51) Int. Cl.
*H04N 13/275* (2018.01)
*G06T 7/521* (2017.01)
*B60Q 9/00* (2006.01)
*B60R 1/00* (2006.01)

(52) U.S. Cl.
CPC ......... *H04N 13/243* (2018.05); *H04N 13/275* (2018.05); *B60R 2300/30* (2013.01); *G06T 2207/10024* (2013.01); *G06T 2207/10048* (2013.01); *G06T 2207/30261* (2013.01)

(58) Field of Classification Search
CPC  G06T 2207/10024; G06T 2207/10048; B60Q 9/008; B60R 1/00; B60R 2300/30; B60R 2300/8093; B60R 2300/301; G01S 17/936
See application file for complete search history.

(56) References Cited

U.S. PATENT DOCUMENTS

| | | | | |
|---|---|---|---|---|
| 8,134,595 | B2* | 3/2012 | Takano | B60R 1/00 348/153 |
| 8,350,724 | B2* | 1/2013 | Szczerba | G01S 13/931 340/932.2 |
| 8,446,471 | B2* | 5/2013 | Wu | G06T 3/4038 348/148 |
| 8,629,903 | B2* | 1/2014 | Seder | G02B 27/01 348/115 |
| 8,885,045 | B2* | 11/2014 | Yanagi | B60R 1/00 348/147 |
| 9,434,381 | B2* | 9/2016 | Windeler | G06K 9/00791 |
| 9,457,632 | B1* | 10/2016 | Windeler | B60D 1/366 |
| 10,108,867 | B1* | 10/2018 | Vallespi-Gonzalez | G01S 17/86 |
| 10,315,563 | B1* | 6/2019 | Harper | B60Q 5/008 |
| 10,414,336 | B1* | 9/2019 | Harper | B60Q 5/006 |
| 10,486,485 | B1* | 11/2019 | Levinson | B60W 50/0098 |
| 2002/0110262 | A1* | 8/2002 | Iida | B62D 15/0295 382/104 |
| 2003/0083790 | A1* | 5/2003 | Hattori | G06K 9/00805 701/1 |
| 2004/0260469 | A1* | 12/2004 | Mizusawa | B60R 1/00 701/300 |
| 2005/0063565 | A1* | 3/2005 | Nagaoka | B60R 21/013 382/104 |
| 2006/0115119 | A1* | 6/2006 | Nagaoka | G01S 11/12 382/104 |
| 2007/0085901 | A1* | 4/2007 | Yang | G06T 3/4038 348/47 |
| 2010/0113149 | A1* | 5/2010 | Suddreth | G01C 23/00 463/31 |
| 2011/0216962 | A1* | 9/2011 | Kim | G06T 7/507 382/154 |
| 2013/0158786 | A1* | 6/2013 | Fukano | E02F 9/2045 701/34.4 |
| 2014/0104423 | A1* | 4/2014 | Choi | G06K 9/00791 348/148 |
| 2014/0270378 | A1* | 9/2014 | Aimura | G06K 9/00805 382/103 |
| 2014/0351073 | A1* | 11/2014 | Murphy | G01B 11/02 705/23 |
| 2015/0012185 | A1* | 1/2015 | Harda | B60W 30/16 701/45 |
| 2015/0035962 | A1* | 2/2015 | Nagaoka | G06K 9/00805 348/77 |
| 2015/0249821 | A1* | 9/2015 | Tanizumi | B66C 13/00 348/46 |
| 2015/0291097 | A1* | 10/2015 | O'Cualain | H04N 7/183 348/148 |
| 2016/0086033 | A1* | 3/2016 | Molin | G06K 9/4652 345/419 |
| 2016/0098612 | A1* | 4/2016 | Viviani | H04N 5/33 382/103 |
| 2016/0119587 | A1* | 4/2016 | Tan | B60R 1/00 348/148 |
| 2017/0039438 | A1* | 2/2017 | Homma | G06K 9/00805 |
| 2017/0223235 | A1* | 8/2017 | Kang | G06K 9/00463 |
| 2017/0287186 | A1* | 10/2017 | Saito | H04N 13/296 |
| 2018/0107210 | A1* | 4/2018 | Harnett | B64D 1/02 |
| 2018/0284779 | A1* | 10/2018 | Nix | G08G 1/202 |
| 2019/0009719 | A1* | 1/2019 | Kondo | B60R 1/00 |
| 2019/0100146 | A1* | 4/2019 | Chen | G01C 21/365 |
| 2019/0179979 | A1* | 6/2019 | Melick | G01P 21/02 |
| 2019/0197720 | A1* | 6/2019 | Okubo | G06K 9/00805 |
| 2019/0250626 | A1* | 8/2019 | Ghafarianzadeh | G06K 9/6282 |
| 2019/0278272 | A1* | 9/2019 | Zhao | G05D 1/0231 |
| 2019/0303725 | A1* | 10/2019 | Gurvich | G06K 9/00664 |
| 2019/0340775 | A1* | 11/2019 | Lee | G05D 1/0212 |
| 2019/0346844 | A1* | 11/2019 | Chen | B60W 60/00 |
| 2019/0355257 | A1* | 11/2019 | Caldwell | B60W 30/095 |
| 2019/0371052 | A1* | 12/2019 | Kehl | G01C 21/32 |
| 2020/0033140 | A1* | 1/2020 | Gautam | G01S 17/931 |
| 2020/0066169 | A1* | 2/2020 | Li | H04N 13/221 |
| 2020/0068799 | A1* | 3/2020 | Slembrouck | G05D 1/0274 |
| 2020/0117200 | A1* | 4/2020 | Akella | B60W 30/0953 |
| 2020/0134783 | A1* | 4/2020 | Mori | H04N 5/222 |
| 2020/0139967 | A1* | 5/2020 | Beller | B60W 30/165 |

FOREIGN PATENT DOCUMENTS

| | | |
|---|---|---|
| CN | 102316306 A | 1/2012 |
| TW | 201511997 A | 4/2015 |
| TW | 201601952 A | 1/2016 |
| TW | M572044 U | 12/2018 |

* cited by examiner

OBSTACLE WARNING APPARATUS FOR VEHICLE

CROSS-REFERENCE TO RELATED APPLICATION

This application claims the benefit of U.S. Provisional Application No. 62/630,276, filed on Feb. 14, 2018, in the United States Patent and Trademark Office, the disclosure of which is incorporated herein in its entirety by reference.

BACKGROUND OF THE INVENTION

1. Field of the Invention

The present invention relates to an obstacle warning apparatus for vehicle, more particularly to an obstacle warning apparatus capable of receiving visible-light images and infrared-light images, at the same time, for detecting and determining obstacle.

2. Description of the Related Art

A conventional anti-collision system installed on a vehicle utilizes an image processing technology to perform image processing on visible-light images for detecting obstacles, or only makes sounds, such as sound of a buzzer of a reversing radar buzzer, to notify the driver of an obstacle. However, it is difficult to detect obstacles on the ground effectively by a conventional anti-collision system. For example, the obstacles detected by image processing technology are mostly larger, so it is more difficult to detect shorter obstacles (such as such as a small traffic cones or a protrusion on the road) by using image processing technology only. As a result, a conventional anti-collision system cannot completely ensure the driving safety of the driver. Therefore, what is needed is to develop an obstacle warning apparatus for vehicle, to solve the above-mentioned conventional problems.

SUMMARY OF THE INVENTION

In order to solve the conventional problem, the objective of the present invention is to provide an obstacle warning apparatus for vehicle, to detect an obstacle.

According to an embodiment, the present invention provides an obstacle warning apparatus for vehicle, and the obstacle warning apparatus for vehicle includes at least one camera module, a surround-view processor, an obstacle processor, and an image synthesizer. Each camera module is disposed on the vehicle and includes a projector and a receiver. The projector is configured to project structured infrared light on a region of interest (ROI) outside of the vehicle. The receiver includes a red-light detector, a green-light detector, a blue-light detector, and an infrared-light detector, and the receiver receives a first image and a second image generated by visible light and the structured infrared light reflected from the region of interest, respectively. The surround-view processor is configured to receive the first image and generate the surround-view data. The obstacle processor is configured to receive the second image and generate the obstacle data according to a deformed pattern of the structured infrared light formed by the obstacle on the region of interest on which the structured infrared light is projected. The obstacle data includes a height value from a top surface of the obstacle to a reference plane where the obstacle is located. The image synthesizer is configured to receive the surround-view data and the obstacle data, and generate the synthesized image according to the surround-view data and the obstacle data, and display the obstacle in the synthesized image by a plurality of levels or a contour-line image, according to the height value.

Preferably, the surround-view processor and the obstacle processor receives the first image and the second image at different time points, respectively, and the frame rate of receiving the first image and the second image are 30 fps.

Preferably, the receiver comprises a horizontal field of view, a vertical field of view, a tilt angle and a sweep angle. The horizontal field of view is greater than 190 degrees, the vertical field of view is greater than 100 degrees, the tilt angle is toward a ground direction and in a range from 0 degrees to 90 degrees relative to a horizontal plane, and the sweep angle is toward outside of the vehicle and in a range from 0 degrees to 15 degrees.

Preferably, the region of interest is located in the traveling direction of the vehicle or each side of the vehicle.

Preferably, the structured infrared light is projected on the region of interest to generate the plurality of light spots. A minimal array range of the plurality of light spots satisfies the condition Dots=FOV/θ, and θ=S/R. Dots is a number of the plurality of light spots in a length direction or a width direction. FOV is the horizontal field of view or the vertical field of view of the receiver. θ is an included angle of one of the plurality of light spots relative to the projector. S is a distance of two adjacent light spots of the plurality of light spots projected in the region of interest. R is a distance from one of the plurality of light spots to the projector.

Preferably, when the height value is greater than a threshold value, the obstacle processor generates the prompt data.

Preferably, the threshold value is 10 cm.

Preferably, the image synthesizer receives the prompt data, and generates a height warning image shown in the synthesized image, according to the prompt data.

Preferably, the obstacle processor computes a distance from the obstacle to the vehicle in real time and generate a distance data, and when the distance from the obstacle to the vehicle is lower than a safe distance, a prompting device electrically connected to the image synthesizer generates at least one of a sound prompt signal, a light prompt signal, and a vibration prompt signal.

The present invention further provides an obstacle warning apparatus for vehicle, and the obstacle warning apparatus for vehicle includes a plurality of camera modules, a surround-view processor, an obstacle processor, and an image synthesizer. The plurality of camera modules are disposed on the vehicle, and each camera module includes a projector and a receiver. The projector is configured to project a structured infrared light on a region of interest outside of the vehicle. The receiver includes a red-light detector, a green-light detector, a blue-light detector, and an infrared-light detector, and the receiver is configured to receive a first image and a second image generated by visible light and the structured infrared light reflected from the region of interest, respectively. The surround-view processor is configured to receive the first images and generate the surround-view data. The obstacle processor is configured to receive the second images, and generate the obstacle data according to the deformed pattern formed by the obstacle on the region of interest on which the structured infrared light is projected. The obstacle data comprises a height value from a top surface of the obstacle to a reference plane where the obstacle is located. The image synthesizer is configured to receive the surround-view data and the obstacle data and generate the synthesized image according to the surround-view data and the obstacle data, and display the obstacle in the synthesized image by a plurality of levels or a contour-line image, according to the height value.

Preferably, the surround-view processor and the obstacle processor receive the first images and the second images at the same time, and the frame rate of receiving the first image and the second image are 30 fps.

Preferably, the surround-view processor generates the surround-view data according to the image stitching and image blending algorithm.

Preferably, when the height value is greater than a threshold value, the obstacle processor generates the prompt data.

Preferably, the threshold value is 30 cm.

Preferably, the plurality of camera modules are disposed on each side of the vehicle, and face toward the traveling direction of the vehicle.

Preferably, the image synthesizer generates a 3D geometry model according to the first images, the second images, the local coordinate systems of the plurality of camera modules, and the 3D geometry model comprise a plurality of local coordinates of the local coordinate systems, and a plane having a maximal area in the 3D geometry model is defined as a reference road plane.

Preferably, after the reference road plane is defined, the image synthesizer transforms the plurality of local coordinates into a plurality of global coordinates of a global coordinate system corresponding to a position of the vehicle. In the global coordinate system, the obstacle higher than the reference road plane and having a height greater than a threshold value is defined as a to-be-warned obstacle.

Preferably, the receiver comprises a horizontal field of view, a vertical field of view, a tilt angle and a sweep angle. The horizontal field of view is greater than 190 degrees. The vertical field of view is greater than 100 degrees. The tilt angle is toward a ground direction and in a range from 0 degrees to 90 degrees relative to a horizontal plane. The sweep angle is toward outside of the vehicle and in a range from 0 degrees to 15 degrees.

The region of interest is an area with a length of 2 m and a width of 5 m. The width direction is perpendicular to an optical axis of one of the plurality of camera modules, and the structured infrared light is projected on the region of interest to generate the plurality of light spots. A minimal array range of the plurality of light spots satisfies the condition Dots=FOV/θ, and θ=S/R. Dots is a number of the plurality of light spots located in a length direction or the width direction. FOV is the horizontal field of view or the vertical field of view of the receiver. θ is an included angle of one of the plurality of light spots relative to the projector. S is a distance of two adjacent light spots of the plurality of light spots projected in the region of interest. R is a distance from one of the plurality of light spots to the projector.

The present invention also provides an obstacle warning apparatus for vehicle, and the obstacle warning apparatus for vehicle includes a plurality of camera modules, a surround-view processor, an obstacle processor, and an image synthesizer. The plurality of camera modules are disposed on a head side, a door side and a rear side of the vehicle, respectively, and each camera modules includes a projector and a receiver. The projector is configured to project structured infrared light on a region of interest outside of the vehicle. The receiver is configured to receive a first image and a second image generated by the visible light and the structured infrared light reflected from the region of interest, respectively. The surround-view processor is configured to receive the first image and generate the surround-view data according to the image stitching and image blending algorithm. The obstacle processor is configured to receive the second image and generate the obstacle data according to a deformed pattern formed by an obstacle on the region of interest on which the structured infrared light is projected. The obstacle data comprises a height value from a top surface of the obstacle to a reference plane where the obstacle is located, and when the height value is greater than a threshold value, the obstacle processor generates the prompt data. The image synthesizer is configured to receive the surround-view data and the obstacle data and generate a synthesized image according to the surround-view data and the obstacle data, and display the obstacle in the synthesized image by a plurality of levels or a contour-line image, according to the height value.

Preferably, the distance between the projector and the receiver is lower than 20 cm.

Preferably, the receiver comprise at least one fisheye lens.

Preferably, the image synthesizer generates a 3D geometry model according to the first images, the second images, and the local coordinate systems of the plurality of camera modules. The 3D geometry model comprises a plurality of local coordinates of the local coordinate systems. The plane having a maximal area in the 3D geometry model is defined as a reference road plane.

Preferably, after the reference road plane is defined, the image synthesizer transforms a plurality of local coordinates into a plurality of global coordinates of a global coordinate system corresponding to a position of the vehicle. In the global coordinate system, the obstacle higher than the reference road plane and having a height greater than 10 cm is defined as a to-be-warned obstacle.

After the reference road plane is defined, the image synthesizer transforms a plurality of local coordinate into a plurality of global coordinates of a global coordinate system corresponding to a vehicle position. In the global coordinate system, the obstacle higher than the reference road plane and having a height greater than 30 cm is defined as a to-be-warned obstacle.

BRIEF DESCRIPTION OF THE DRAWINGS

The structure, operating principles and effects of the present invention will be described in detail by way of various embodiments which are illustrated in the accompanying drawings.

DETAILED DESCRIPTION OF THE PREFERRED EMBODIMENTS

Figure 1:
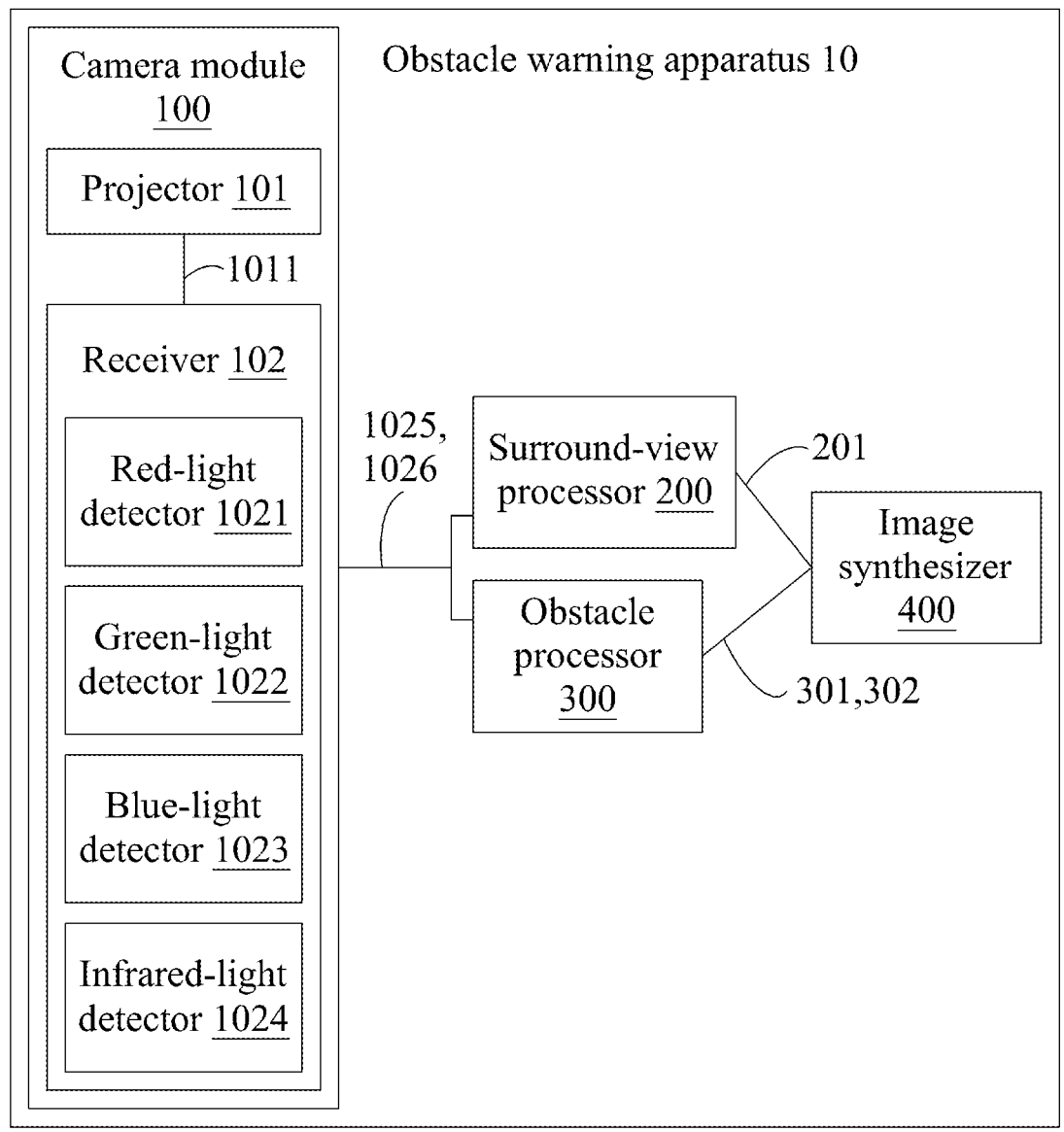
FIG. 1 is a schematic view of configuration of an obstacle warning apparatus for vehicle of and embodiment of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

First Embodiment

Figure 2:
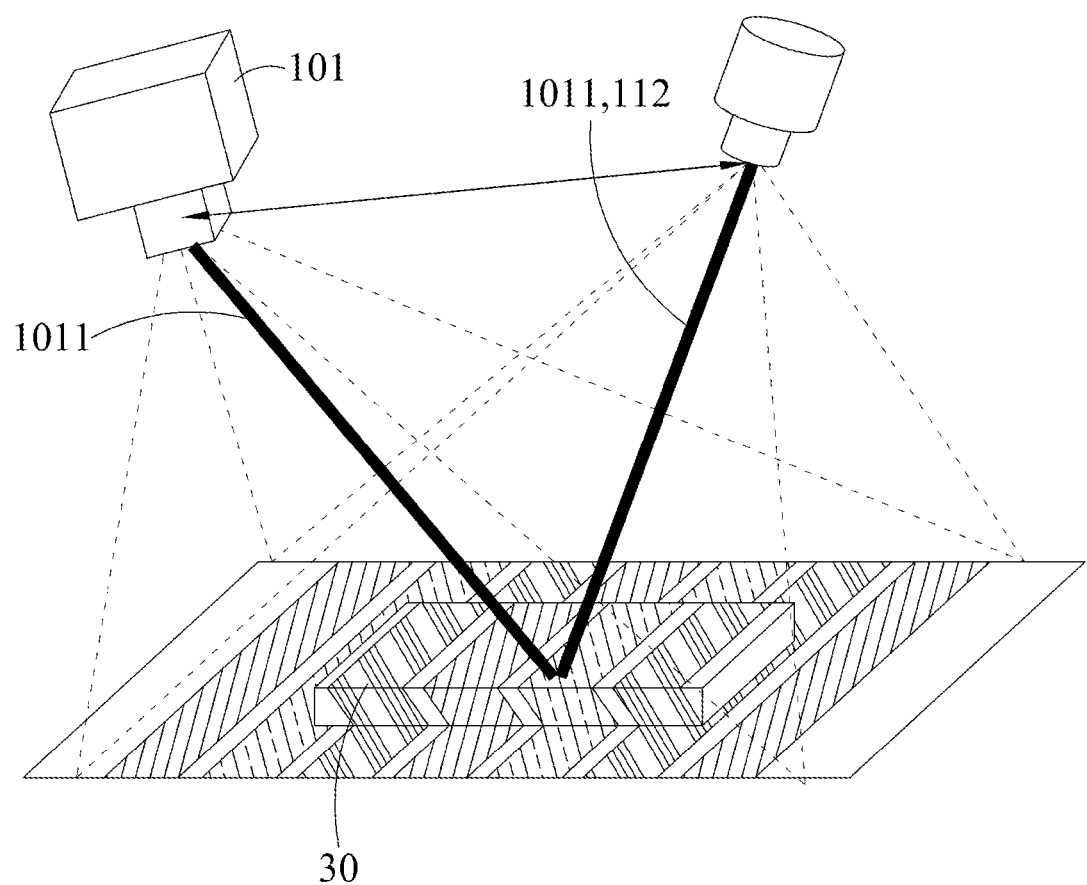
FIG. 2 is a first schematic view of a camera module of an embodiment of the present invention.
Figure 3:
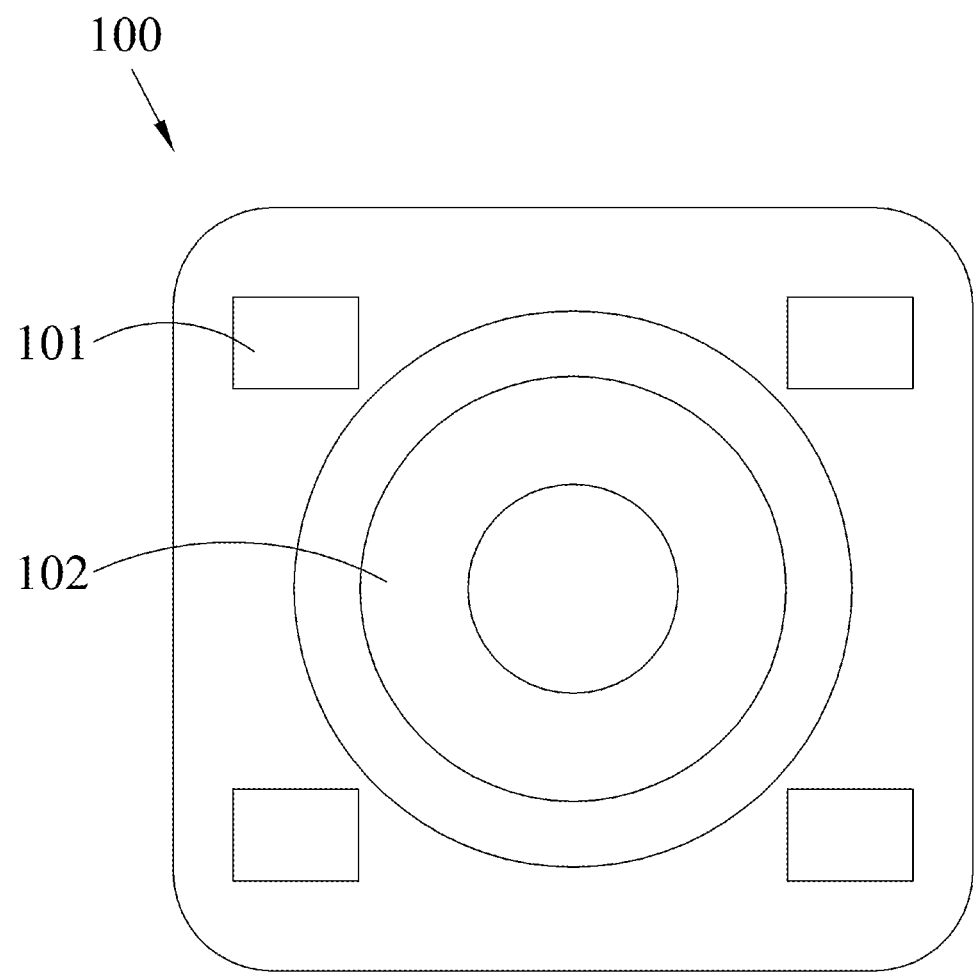
FIG. 3 is a second schematic view of a camera module of an embodiment of the present invention.

Please refer to FIGS. 1 to 3. The present invention provides an obstacle warning apparatus 10 including at least one camera module 100, a surround-view processor 200, an obstacle processor 300 and an image synthesizer 400.

The camera module 100 is disposed on the vehicle 20, and comprises a projector 101 and a receiver 102. The projector 101 can project the structured infrared light 1011 to the region of interest (ROI) 50 outside of the vehicle 20. The receiver 102 comprises a red-light detector 1021, a green-light detector 1022, a blue-light detector 1023, and an infrared-light detector 1024. The receiver 102 is configured to receive a first image 1025 and a second image 1026 generated by the structured infrared light 1011 and visible light 112 both reflected from the region of interest 50, respectively.

Figure 7:
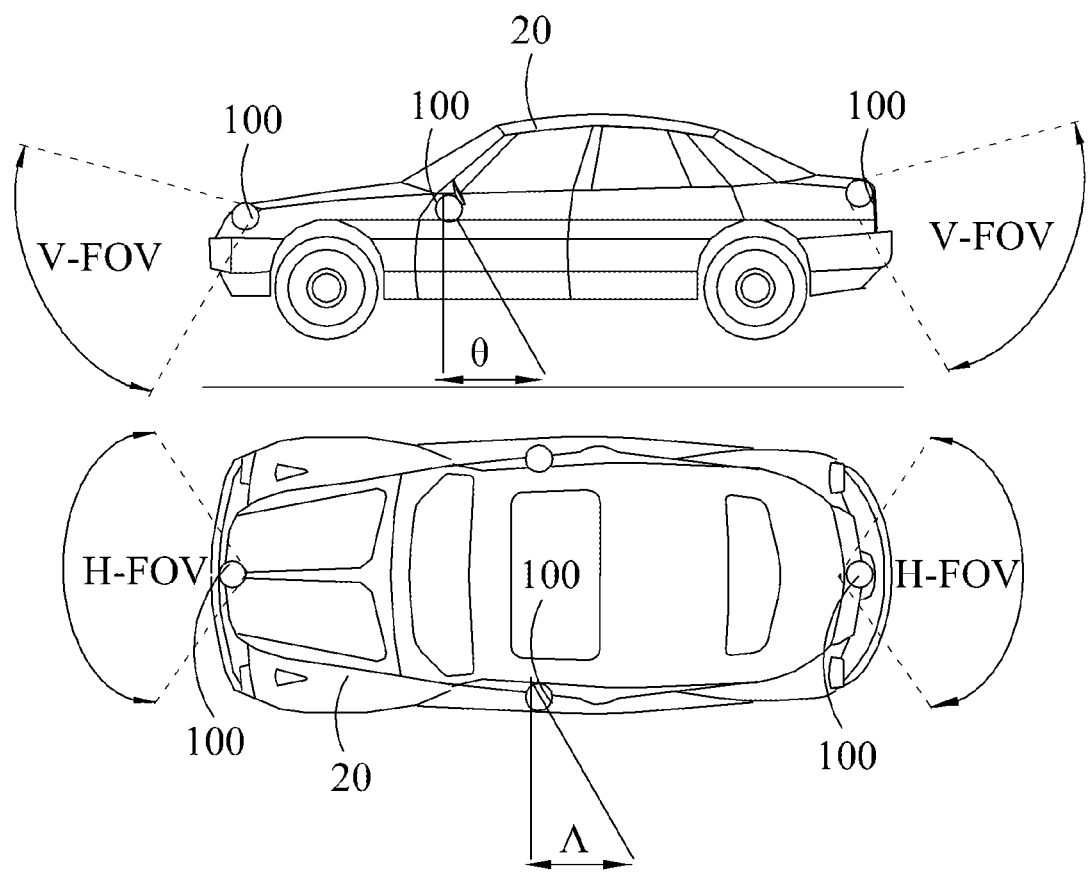
FIG. 7 is a schematic view of a camera module of an obstacle warning apparatus of an embodiment of the present invention.

As shown in FIG. 7, in an embodiment, the receiver 102 can have a horizontal field of view (H-FOV), a vertical field of view (V-FOV), a tilt angle (θ), and a sweep angle (Λ). Preferably, the horizontal field of view can be greater than 190 degrees, the vertical field of view can be greater than 100 degrees, the tilt angle can be toward a ground direction and in a range from 0 degrees to 90 degrees relative to a horizontal plane. The sweep angle can be toward outside of the vehicle and in a range from 0 degrees to 15 degrees.

Furthermore, because of the red-light detector 1021, the green-light detector 1022, the blue-light detector 1023, and the infrared-light detector 1024, the receiver 102 can use the red-light detector 1021, the green-light detector 1022 and the blue-light detector 1023 to receive visible light synchronously and the infrared-light detector 1024 receives the structured infrared light 1011. By the foregoing configuration, the first image 1025 and the second image 1026 are not affected by each other. In this way, the occurrence of speckle or noise can be prevented.

Figure 4:
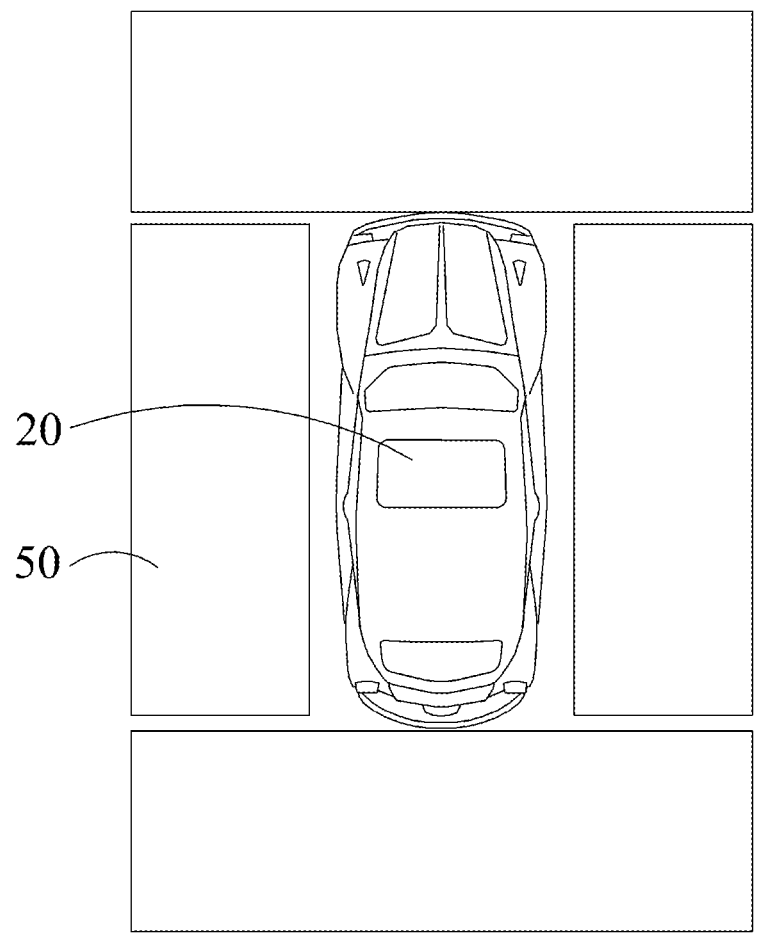
FIG. 4 is a schematic view of the region of interest defined an obstacle warning apparatus of an embodiment of the present invention.

As shown in FIG. 4, in an embodiment, the region of interest 50 can be located in a traveling direction of the vehicle and on each side of the vehicle. For example, the regions of interest 50 can include a region located in a forward direction, a reverse direction, and a lateral direction of the vehicle, so as to create a round-view image without blind spot. When the vehicle is a sedan, the ROI 50 can have an area with a length of 2 m and a width of 5 m. The width direction of the ROI 50 is perpendicular to an optical axis of the camera module 100, so that the obstacle warning apparatus for vehicle of the present invention can effectively prevent the vehicle 20 from colliding or contacting the obstacle 30 on the ROI 50, thereby ensuring driving safety.

The surround-view processor 200 can receive the first image 1025 and generate the surround-view data 201 according to the first image 1025. The obstacle processor 300 can receive the second image 1026, and generate the obstacle data 301 according to the deformed pattern formed by the obstacle 30 on the region of interest 50 on which the structured infrared light 1011 is projected. The obstacle data 301 can be a value of height 3011 from a top surface of the obstacle 30 to a reference plane where the obstacle 30 is located, that is, when the vehicle is located on flat ground, the obstacle data 301 can be a value of height 3011 from a top surface of the obstacle 30 to ground.

Furthermore, in an embodiment, the surround-view processor 200 and the obstacle processor 300 can receive the first image 1025 and the second image 1026 at the same time, or at different time points, or alternatively. The frame rate of the received first image 1025 and the second image 1026 are 30 fps, so that the frame rate of the synthesized image 401 can reach at least 30 fps, to effectively respond the condition of the obstacle 30 in the ROI 50 in time.

In an embodiment, the structured infrared light 1011 can include time-multiplexing structured light, spatial neighborhood structured light, or direct coding structured light. In the description of some embodiments below, the spatial neighborhood is taken as an embodiment for illustration. As shown in FIG. 7, the structured infrared light 1011 can include a plurality of light spots 1012. The light spots projected on the obstacle 30 may be deformed, so the obstacle processor 300 can calculate and generate the obstacle data 301 according to the deformed pattern of the structured infrared light 1011 projected on any obstacle 30 in the ROI 50.

In an embodiment, as shown in FIG. 7, the structured infrared light 1011 projected on the region of interest 50 can generate the plurality of light spots 1012, and the minimal array range of the light spots 1012 satisfies the relationships: Dots=FOV/θ, and θ=S/R. Dots is a number of the light spots 1012 in the length direction or the width direction. FOV is the horizontal field of view or the vertical field of view of the receiver 102. θ is an included angle of any light spot 1012 relative to the projector 101. S is a distance any two adjacent light spots 1012 projected in the region of interest 50. R is a distance from any light spot 1012 to the projector 101. According to the relationship Dots=FOV/θ, when the to-be-detected cylinder has a diameter of 30 cm and is spaced apart from the vehicle 20 by 2 m, the minimal array range of the light spots 1012 can be formed by about 64 light spots 1012 in the length direction and about 48 light spots 1012 in the width direction. When the to-be-detected cylinder has a diameter of 30 cm and spaced apart from the vehicle 20 by 1 m, about 32 light spots 1012 in the length direction and about 24 light spots 1012 in the width direction can form the minimal array range of the light spots 1012.

After obtaining the first image 1205 of the surround-view data 201 and the second image 1026 of the obstacle data 301, as shown in FIGS. 9 to 12, the image synthesizer 400 can receive the surround-view data 201 and the obstacle data 301, and generate a synthesized image 401 according to the surround-view data 201 and the obstacle data 301. The obstacle 30 in the synthesized image 401 by a plurality of levels (such as dangerous levels) or a contour line according to the value of height 3011 is then shown, so as to prompt the position and the value of height 3011 of the obstacle 30 to the user.

In an embodiment, when the value of height 3011 is greater than a threshold value, the obstacle processor 300 can generate prompt data 302. For example, when the threshold value can be 10 cm, the obstacle processor 300 can generate prompt data 302 and the image synthesizer 400 can receive the prompt data 302 and generate a height warning image shown in the synthesized image 401 according to the prompt data 302

In another embodiment, the obstacle processor 300 can compute a distance from any obstacle 30 to the vehicle 20 in real time, and generate distance data. When the distance from any obstacle 30 to the vehicle 20 is lower than a safe distance, the prompting device electrically connected to the image synthesizer 400 can produce at least one of a sound prompt signal, a light beam prompt signal, and a vibration prompt signal.

For example, in an embodiment, the prompting device may include at least one of a sounding element, a light-emitting element, and a vibrating element, so as to produce the at least one of the sound prompt signal, the light beam prompt signal, and the vibration prompt signal.

The obstacle warning apparatus 10 for vehicle of the present invention can be mounted on the vehicle 20. The camera module 100, the surround-view processor 200, the obstacle processor 300 and the image synthesizer 400 are utilized to receive the first image 1025 and the second image 1026 alternatively, so as to observe and detect the obstacle 30 having a height of at least 10 cm, thereby ensuring the driving safety.

Second Embodiment

As shown in FIGS. 1 to 3, the present invention provides an obstacle warning apparatus 10 for vehicle including the plurality of camera modules 100, the surround-view processor 200, the obstacle processor 300, and the image synthesizer 400.

The camera modules 100 can be disposed on the vehicle 20, and each camera module 100 can include the projector 101 and the receiver 102. The projector 101 can project the structured infrared light 1011 to the region of interest 50 outside of the vehicle 20. The receiver 102 may include the red-light detector 1021, the green-light detector 1022, the blue-light detector 1023 and the infrared-light detector 1024, for receiving the first image 1025 and the second image 1026 generated by the visible light 112 and the structured infrared light 1011 both reflected from the region of interest 50.

As shown in FIG. 7, in an embodiment, the receiver 102 of the camera module 100 can include the horizontal field of view, the vertical field of view, the tilt angle and the sweep angle. Preferably, the horizontal field of view can be greater than 190 degrees, the vertical field of view can be greater than 100 degrees, the tilt angle can be toward the ground direction and in a range from 0 degrees to 90 degrees relative to the horizontal plane. The sweep angle can be toward the direction outside of the vehicle 20 and in a range from 0 degrees to 15 degrees.

In an embodiment, the structured infrared light 1011 can include the time-multiplexing structured light, the spatial neighborhood structured light or the direct coding structured light. In the descriptions of some embodiments below, the spatial neighborhood structured light is taken as an example for illustration. The structured infrared light 1011 may include light spots 1012, and the light spots 1012 projected on the obstacle 30 may be deformed. The obstacle processor 300 can then compute and generate the obstacle data 301 according to the deformed pattern formed on any obstacle 30 in the region of interest 50 on which the structured infrared light 1011 is projected.

Figure 8:
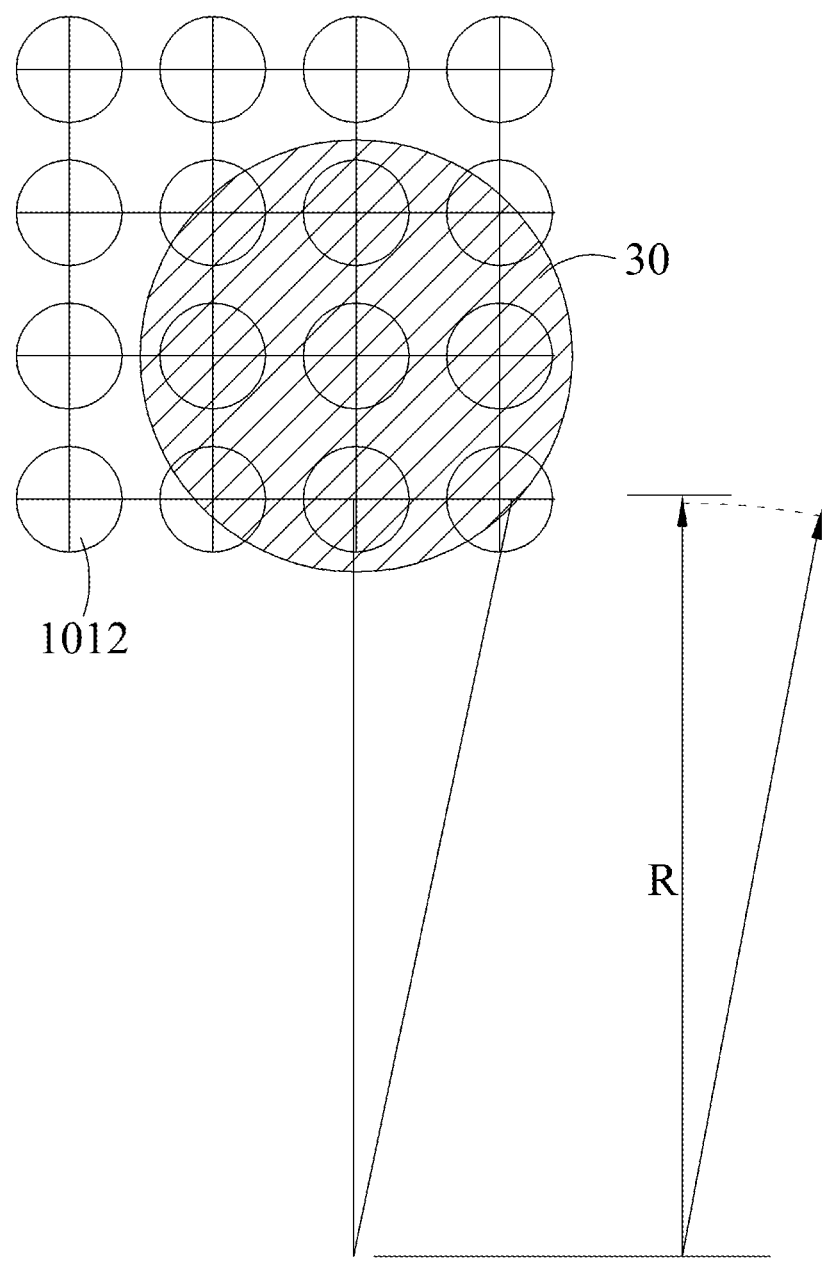
FIG. 8 is a schematic view of a first operation of an obstacle warning apparatus of the present invention.

As shown in FIG. 8, in an embodiment, the structured infrared light 1011 projected on the region of interest 50 can generate light spots 1012. The minimal array range of the light spots 1012 satisfies the conditions Dots=FOV/θ, and θ=S/R. Dots is the number of the light spots 1012 in the length direction or the width direction. FOV is a the horizontal field of view or the vertical field of view of the receiver 102. θ is the included angle of any light spot 1012 relative to the projector 101. S is a distance between any two adjacent light spots 1012 projected on the region of interest 50 and R is a distance from any light spot 1012 to the projector 101. According to the condition Dots=FOV/θ, the minimal array range of the light spots 1012 needs about 64 light spots in the length direction and about 48 light spots 1012 in the width direction to be formed when the to-be-detected cylinder having a diameter of 30 cm is spaced apart from the vehicle 20 by a distance of 2 m. When the cylinder having the diameter of 30 cm is spaced apart from the vehicle 20 by a distance of 1 m, the minimal array range of the light spots 1012 needs about 32 light spots in the length direction and about 24 light spots in the width direction to be formed.

Figure 9:
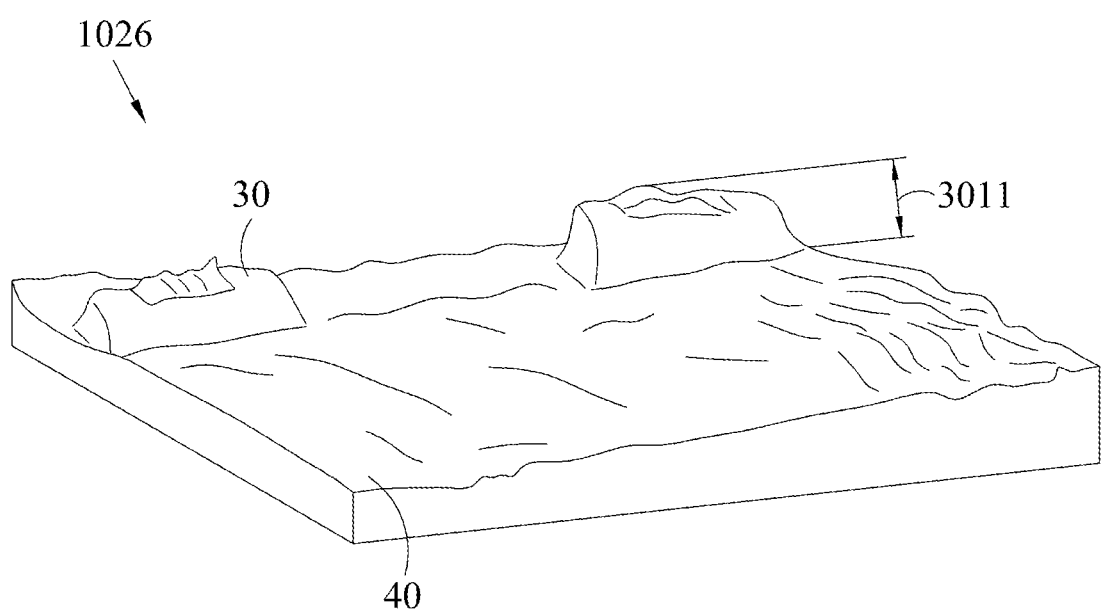
FIG. 9 is a schematic view of a second operation of an obstacle warning apparatus of an embodiment of the present invention.
Figure 10:
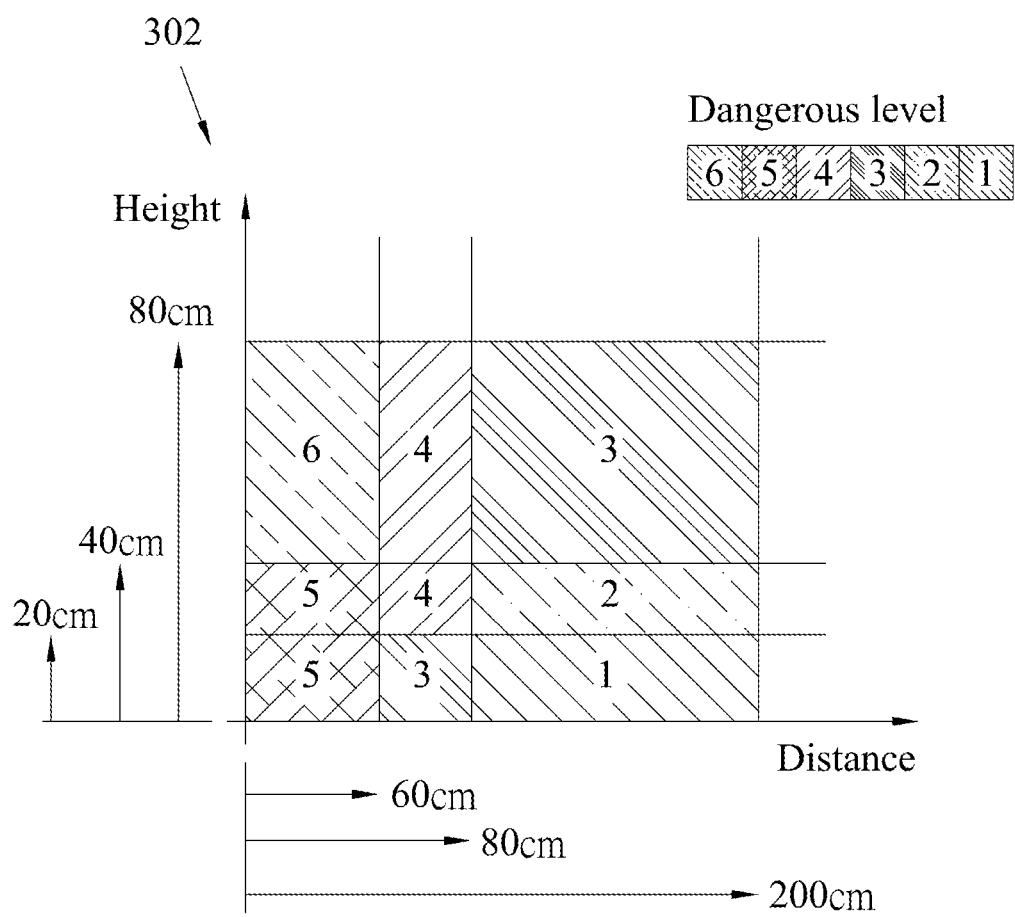
FIG. 10 is a schematic view of a third operation of an obstacle warning apparatus of an embodiment of the present invention.
Figure 11:
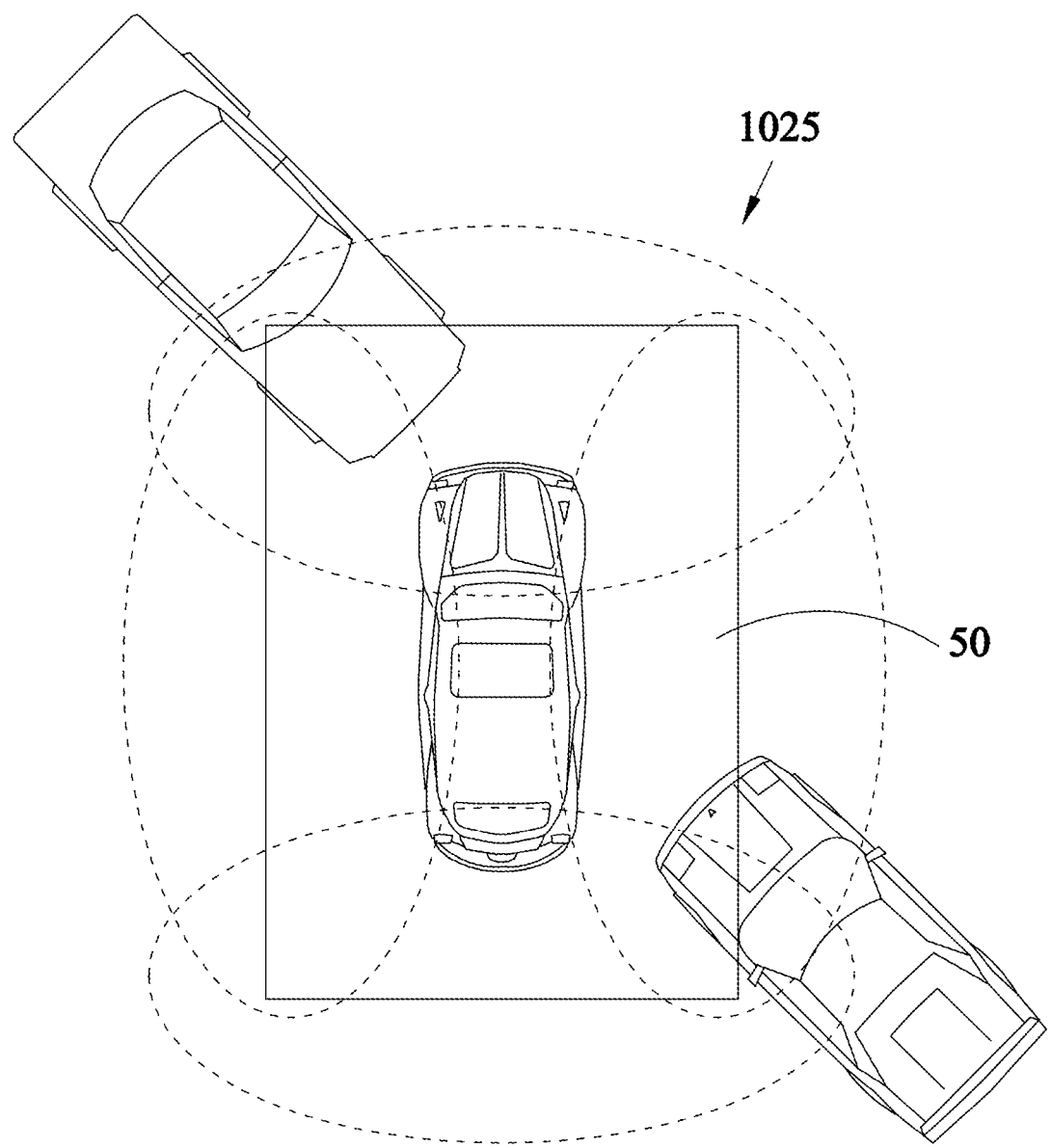
FIG. 11 is a schematic view of a fourth operation of an obstacle warning apparatus of an embodiment of the present invention.
Figure 12:
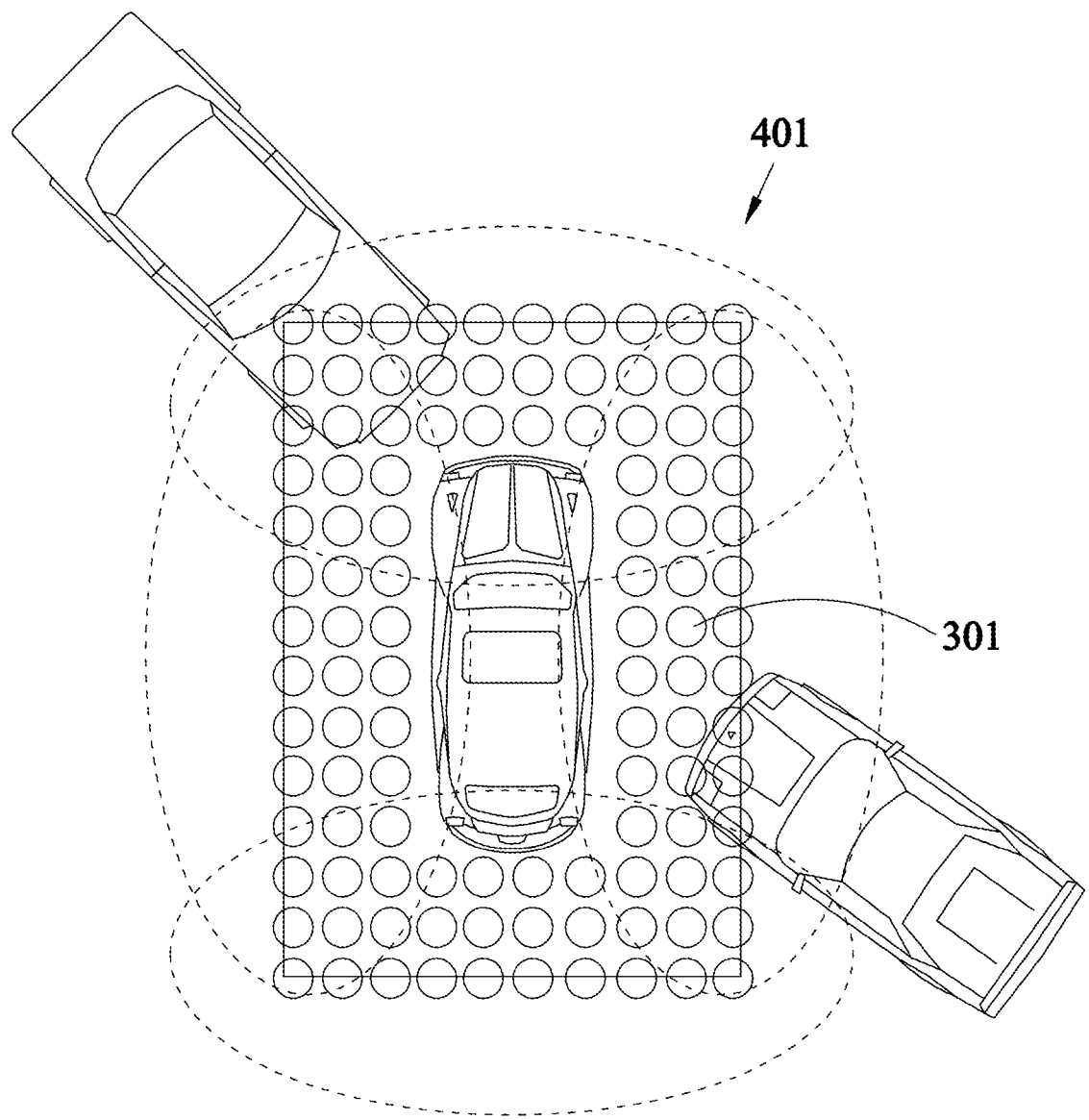
FIG. 12 is a schematic view of a fifth operation of an obstacle warning apparatus of an embodiment of the present invention.
Figure 13:
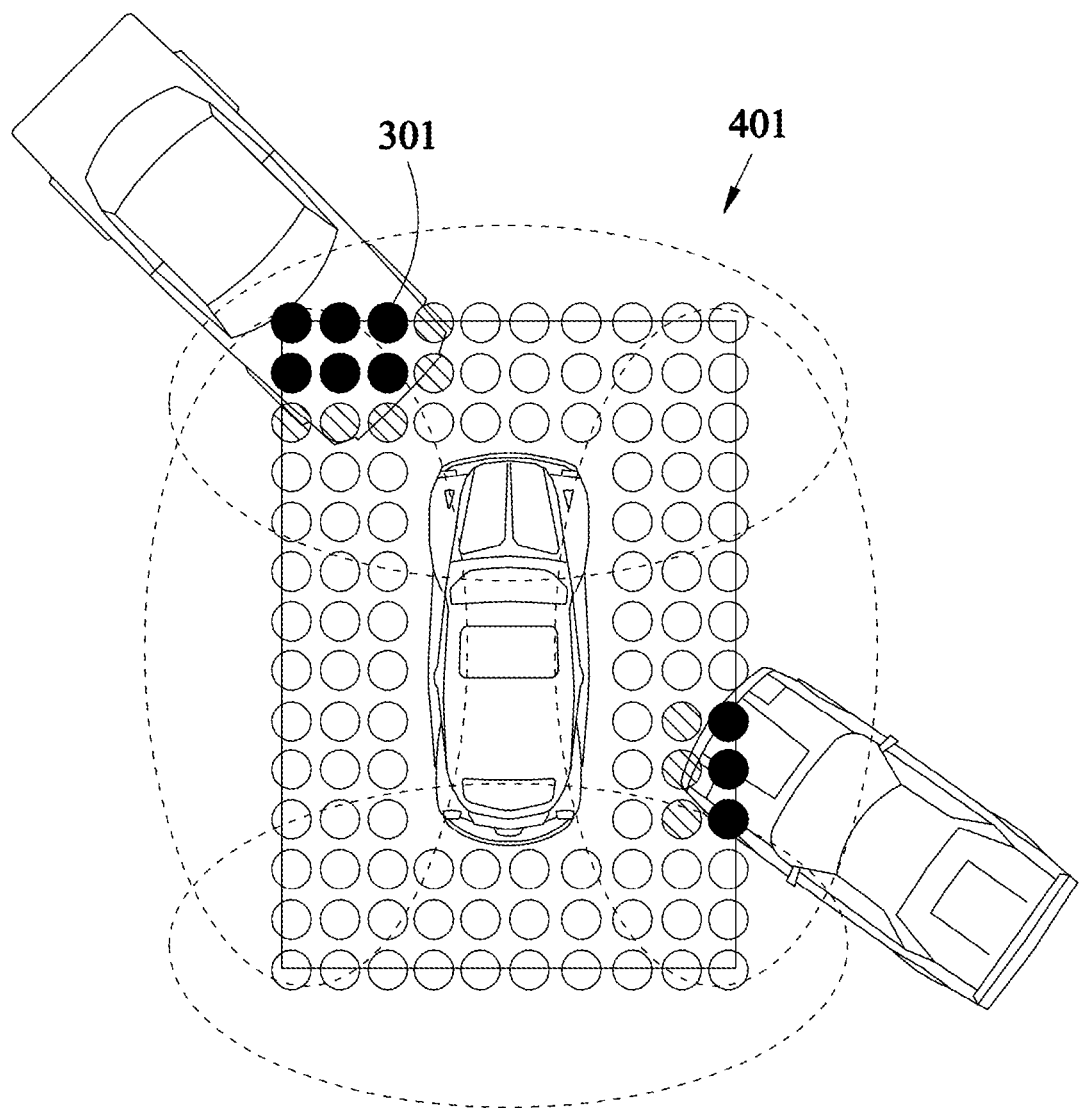
FIG. 13 is a schematic view of a sixth operation of an obstacle warning apparatus of an embodiment of the present invention.

Please refer to FIGS. 10 to 13. The surround-view processor 200 can receive and compute the first image 1025 to generate the surround-view data 201. The obstacle processor 300 can receive the second images 1026, and generate the obstacle data 301 according to the deformed pattern formed on the obstacle 30 in the region of interest 50 on which the structured infrared light 1011 is projected. As shown in FIG. 9, the obstacle data 301 is a value of the height 3011 from the top surface of the obstacle 30 to the reference plane where the obstacle 30 is located. For example, when the vehicle 20 is located on flat ground, the obstacle data 301 can be the value of the vertical height 3011 from the top surface of the obstacle 30 to the ground. The obstacle processor 300 can mark the obstacle 30 in the synthesized image 401 by a plurality of levels (such as dangerous levels) according to the value of the height 3011.

In an embodiment, when the value of the height 3011 is greater than a threshold value (such as 30 cm), the obstacle processor 300 can generate the prompt data 302. Then the image synthesizer 400 can receive the prompt data 302 and generate the height warning image in the synthesized image 401 according to the prompt data 302.

In another embodiment, the obstacle processor 300 can compute the distance from any obstacle 30 to the vehicle 20 in real time to generate the distance data. When the distance from any obstacle 30 to the vehicle 20 is lower than the safe distance, the prompting device electrically connected to the image synthesizer 400 can generate at least one of the sound prompt signal, the light prompt signal, and the vibration prompt signal.

Furthermore, in an embodiment, the surround-view processor 200 and the obstacle processor 300 can receive the plurality of first images 1025 and the plurality of second images 1026 at the same time, and the frame rate of received the first images 1025 and the second images 1026 are 30 fps. The receiver 102 includes the red-light detector 1021, the green-light detector 1022, the blue-light detector 1023, and the infrared-light detector 1024. In this way, the receiver 102 can use the red-light detector 1021, the green-light detector 1022 and the blue-light detector 1023 to receive visible light, and use the infrared-light detector 1024 to receive the structured infrared light 1011. As a result, the first images 1025 and the second images 1026 are not affected by each other, so as to avoid the occurrence of speckle or noise on the received image.

Furthermore, in an embodiment, the camera modules can be disposed on each side of the vehicle and face toward the traveling direction of the vehicle, more particularly, toward the reverse direction, so as to prevent the vehicle from colliding any obstacle 30. When the vehicle 20 is a sedan, the camera module 100 disposed on the head of the sedan is spaced apart from ground by a distance of 50 cm to 85 cm, and the camera module 100 disposed on the door of the sedan can be spaced apart from ground by a distance of 115 cm. The camera module 100 disposed on the tail of the sedan is spaced apart from ground by a distance of 85 cm to 115 cm. The surround-view processor 200 can perform the image stitching and image blending algorithm to process the first images 1025 generated by the camera modules 100, so as to generate the surround-view data 201.

Figure 5:
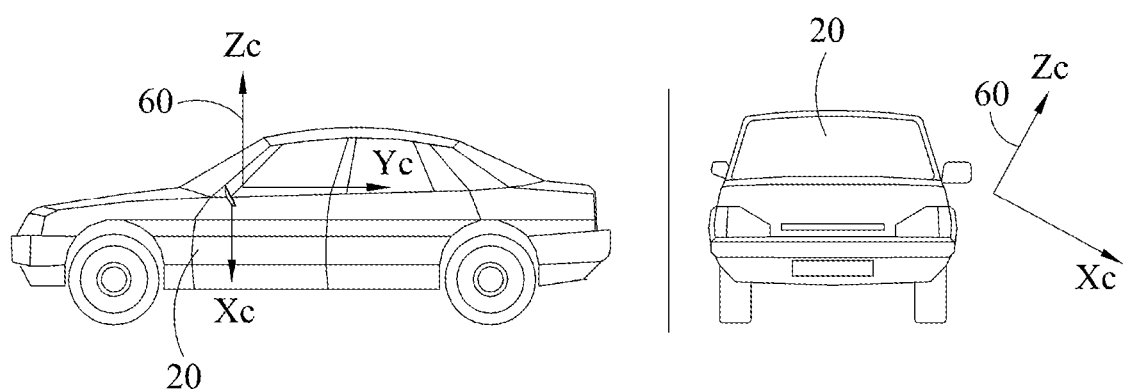
FIG. 5 is a schematic view of a local coordinate system defined in the obstacle warning apparatus of an embodiment of the present invention.
Figure 6:
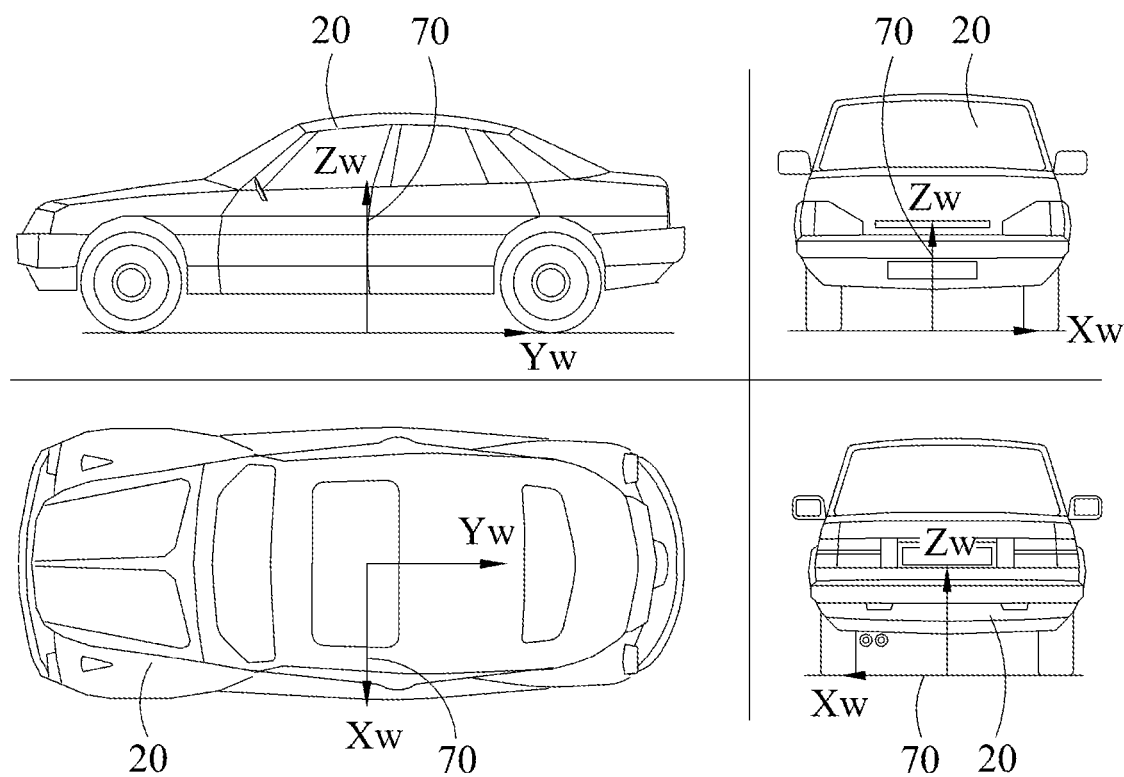
FIG. 6 is a schematic view of a global coordinate system defined in the obstacle warning apparatus of an embodiment of the present invention.

As shown in FIGS. 5 and 6, the image synthesizer 400 400 can generate a 3D geometry model according to the first images 1025, the second images 1026, and local coordinate systems 60 of the camera modules 100. The 3D geometry model may include local coordinates of the local coordinate systems 60, and the plane with maximal area in the 3D geometry model can be defined as a reference road plane 40.

After the reference road plane 40 is defined, the image synthesizer 400 can transform the local coordinates into the global coordinates corresponding to the position of the vehicle 20 in the global coordinate system 70. For example, the local coordinates can be transformed, by a matrix transform manner, to the global coordinates corresponding to the position of the vehicle 20 in the global coordinate system 70. In the global coordinate system, the obstacle 30 higher than the reference road plane 40 and having the height greater than the threshold value can be defined as the to-be-warned obstacle.

In another embodiment, the obstacle processor 300 can compute the distance from any obstacle 30 to the vehicle 20 in real time and generate the distance data. When the distance from any obstacle 30 to the vehicle 20 is lower than the safe distance, the prompting device electrically connected to the image synthesizer 400 can produce at least one of the sound prompt signal, the light prompt signal, and vibration prompt signal.

For example, in an embodiment, the prompting device may include at least one of the sounding element, the light-emitting element, and the vibrating element, so as to produce at least one of the sound prompt signal, the light prompt signal and the vibration prompt signal.

The obstacle warning apparatus for vehicle 10 can be mounted on the vehicle 20; for example, the vehicle 20 can be a sedan. The obstacle warning apparatus for vehicle 10 can use the camera modules 100, the surround-view processor 200, the obstacle processor 300 and the image synthesizer 400 to synchronously receive the first image 1025 and the second image 1026, to detect and observe the obstacle 30 having a height of at least 30 cm, thereby ensuring driving safety.

Third Embodiment

The present invention further provides an obstacle warning apparatus 10 for vehicle. As shown in FIGS. 1 to 3, the obstacle warning apparatus for vehicle 10 can include the plurality of camera modules 100, the surround-view processor 200, the obstacle processor 300, and the image synthesizer 400.

The camera modules 100 can be disposed on the head, the doors and the rear of the vehicle 20, respectively, and each camera module 100 may include the projector 101 and the receiver 102; in an embodiment, the vehicle 20 can be a sedan, a truck, a bus or other vehicle. The projector 101 can project the structured infrared light 1011 to the region of interest 50 outside of the vehicle 20. The receiver 102 can receive the first images 1025 and the second images 1026 generated by the visible light 112 and the structured infrared light 1011 both reflected from the region of interest 50. In an embodiment, the distance between the projector 101 and the receiver 102 can be lower than 20 cm, so that the receiver 102 can completely receive the first images 1025 and the second images 1026.

In an embodiment, the receiver 102 may include at least one fisheye lens, so that the receiver 102 can have a larger field of view (FOV) to fully receive the first image 1025. Furthermore, in an embodiment, the surround-view processor 200 and the obstacle processor 300 can receive the first images 1025 and the second images 1026 at the same time, at different time points, or alternatively. The frame rate about receiving first images 1025 and the second images 1026 can be 30 fps, so that the synthesized image 401 can have the frame rate of which the value is at least 30 fps, to respond the conditions of the obstacle 30 in the region of interest 50 in time.

Please refer to FIGS. 10 to 13. The surround-view processor 200 can receive the first image 1025 and generate the surround-view data 201 according to the first image 1025. The obstacle processor 300 can receive the second image 1026 and generate the obstacle data 301 according to the deformed pattern formed on the obstacle 30 in the region of interest 50 to which the structured infrared light 1011 is projected. When the value of height 3011 is greater than the threshold value, for example, in a range of 10 cm to 50 cm, the obstacle processor 300 can generate the prompt data 302. The obstacle data 301 is the value of height 3011 from the top surface of the obstacle 30 to the reference plane where the obstacle 30 is located. That is, when the vehicle 20 is located on flat ground, the obstacle data 301 can be the value of a vertical height 3011 from the top surface of the obstacle 30 to ground. The obstacle processor 300 can mark or highlight the obstacle 30 in the synthesized image 401 by the plurality of levels (such as dangerous levels) according to the value of height 3011, so as to remind the user of the direction and the height of the obstacle 30.

Furthermore, in an embodiment, the vehicle 20 can be a large-sized vehicle such as a bus or a truck, and the camera modules 100 can be mounted on the head part, the door parts, and the rear part of the vehicle 20 at half of the height of the vehicle body of the vehicle 20. The receiver 102 of the camera module 100 can have the horizontal field of view greater than 190 degrees and the vertical field of view greater than 100 degrees. The receiver 102 of the camera module 100 can have the tilt angle toward the ground direction being in a range from 0 degrees to 90 degrees relative to the horizontal plane, and the sweep angle toward outside of the vehicle 20 being in a range from 0 degrees to 15 degrees. The surround-view processor 200 can perform the image stitching and image blending algorithm computation on the first images 1025 generated by the camera modules 100, to generate the surround-view data 201.

As shown in FIGS. 5, 6, and 9, the image synthesizer 400 can generate the 3D geometry model according to the first images 1025, the second images 1026 and the local coordinate systems 60 of the camera modules 100. The 3D geometry model may include local coordinates of the local coordinate systems 60, and the plane having the maximal area in the 3D geometry model can be defined as the reference road plane 40.

After the reference road plane 40 is defined, the image synthesizer 400 can transform the local coordinates into the global coordinates in the global coordinate system 70 corresponding to the position of the vehicle 20. For example, the local coordinates can be transformed, by the matrix transformation manner, to the global coordinates in the global coordinate system 70 corresponding to the position of the vehicle 20. In the global coordinate system 70, the obstacle 30 higher than the reference road plane 40 and having a height greater than a threshold value can be defined as the to-be-warned obstacle.

In another embodiment, the obstacle processor 300 can compute the distance from any obstacle 30 to the vehicle 20 in real time, and generate the distance data. When the distance from any obstacle 30 to the vehicle 20 is lower than the safe distance, the prompting device electrically connected to the image synthesizer 400 can produce at least one of the sound prompt signal, the light prompt signal, and the vibration prompt signal.

For example, in an embodiment, the prompting device may include at least one of the sounding element, the light-emitting element, and the vibrating element, so as to produce at least one of the sound prompt signal, the light prompt signal and the vibration prompt signal.

The obstacle warning apparatus for vehicle 10 of the present invention can be mounted on the vehicle 20 which can be various vehicle. The obstacle warning apparatus for vehicle 10 can use the camera modules 100, the surround-view processor 200, the obstacle processor 300 and the image synthesizer 400 to synchronously or alternatively receive the first images 1025 and the second images 1026. In this way, the obstacle warning apparatus for vehicle 10 can detect and observe the obstacle 30 having the height of at least 10 cm to 50 cm, thereby ensuring driving safety.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An obstacle warning apparatus for vehicle, comprising:
   at least one camera module disposed on the vehicle and comprising:
   a projector configured to project a structured infrared light on a region of interest outside of the vehicle; and
   a receiver comprising a red-light detector, a green-light detector, a blue-light detector and an infrared-light detector, and configured to receive a first image and a second image generated by visible light and the structured infrared light reflected from the region of interest, respectively;
   a surround-view processor configured to receive the first image and generate surround-view data;
   an obstacle processor configured to receive the second image and generate obstacle data according to a deformed pattern of the structured infrared light generated by the obstacle in the region of interest on which the structured infrared light is projected, wherein the obstacle data includes a height value from a top surface of the obstacle to a reference plane where the obstacle is located; and
   an image synthesizer configured to receive the surround-view data and the obstacle data, generate a synthesized image according to the surround-view data and the obstacle data, and display the obstacle in the synthesized image by a plurality of levels or a contour-line image, according to the height value.

2. The obstacle warning apparatus for vehicle according to claim 1, wherein the surround-view processor and the obstacle processor receive the first image and the second image at different time points, respectively, and the frame rate of receiving the first image and the second image are 30 fps.

3. The obstacle warning apparatus for vehicle according to claim 1, wherein the receiver comprises a horizontal field of view, a vertical field of view, a tilt angle and a sweep angle, the horizontal field of view is greater than 190 degrees, the vertical field of view is greater than 100 degrees, the tilt angle is toward a ground direction and in a range from 0 degrees to 90 degrees relative to a horizontal plane, and the sweep angle is toward outside of the vehicle and in a range from 0 degrees to 15 degrees.

4. The obstacle warning apparatus for vehicle according to claim 1, wherein the region of interest is located in a traveling direction of the vehicle or each side of the vehicle.

5. The obstacle warning apparatus for vehicle according to claim 4, wherein the structured infrared light is projected on the region of interest to generate a plurality of light spots, a minimal array range of the plurality of light spots satisfies the conditions Dots=FOV/θ, and θ=S/R, wherein Dots is a number of the plurality of light spots in a length direction or a width direction, FOV is the horizontal field of view or the vertical field of view of the receiver, and θ is an included angle of one of the plurality of light spots relative to the projector, S is a distance of two adjacent light spots of the plurality of light spots projected in the region of interest, and R is a distance from one of the plurality of light spots to the projector.

6. The obstacle warning apparatus for vehicle according to claim 1, wherein when the height value is greater than a threshold value, the obstacle processor generates prompt data.

7. The obstacle warning apparatus for vehicle according to claim 6, wherein the threshold value is 10 cm.

8. The obstacle warning apparatus for vehicle according to claim 6, wherein the image synthesizer receives the prompt data, and generate a height warning image shown in the synthesized image, according to the prompt data.

9. The obstacle warning apparatus for vehicle according to claim 1, wherein the obstacle processor computes a distance from the obstacle to the vehicle in real time and generate distance data, and when the distance from the obstacle to the vehicle is lower than a safe distance, a prompting device electrically connected to the image synthesizer generates at least one of a sound prompt signal, a light prompt signal, and/or a vibration prompt signal.

10. An obstacle warning apparatus for vehicle, comprising:
a plurality of camera modules disposed on the vehicle, and each of the plurality of camera modules comprising:
a projector configured to project a structured infrared light on a region of interest outside of the vehicle; and
a receiver comprising a red-light detector, a green-light detector, a blue-light detector, and an infrared-light detector, and configured to receive a first image and a second image generated by visible light and the structured infrared light reflected from the region of interest, respectively;
a surround-view processor configured to receive the first images and generate surround-view data;
an obstacle processor configured to receive the second images, and generate obstacle data according to the deformed pattern generated by the obstacle on the region of interest on which the structured infrared light is projected, wherein the obstacle data comprises a height value from a top surface of the obstacle to a reference plane where the obstacle is located; and
an image synthesizer configured to receive the surround-view data and the obstacle data and generate a synthesized image according to the surround-view data and the obstacle data, and display the obstacle in the synthesized image by a plurality of levels or a contour-line image, according to the height value.

11. The obstacle warning apparatus for vehicle according to claim 10, wherein the surround-view processor and the obstacle processor receive the first images and the second images at the same time, and the frame rate of receiving the first image and the second image are 30 fps.

12. The obstacle warning apparatus for vehicle according to claim 10, wherein the surround-view processor generate the surround-view data according to an image stitching and image blending algorithm.

13. The obstacle warning apparatus for vehicle according to claim 10, wherein when the height value is greater than a threshold value, the obstacle processor generates prompt data.

14. The obstacle warning apparatus for vehicle according to claim 13, wherein the threshold value is 30 cm.

15. The obstacle warning apparatus for vehicle according to claim 10, wherein the plurality of camera modules are disposed on each side of the vehicle, and face toward a traveling direction of the vehicle.

16. The obstacle warning apparatus for vehicle according to claim 10, wherein the image synthesizer generates a 3D geometry model according to the first images, the second images, the local coordinate systems of the plurality of camera modules, and the 3D geometry model comprise a plurality of local coordinates of the local coordinate systems, and a plane having a maximal area in the 3D geometry model is defined as a reference road plane.

17. The obstacle warning apparatus for vehicle according to claim 16, wherein after the reference road plane is defined, the image synthesizer transforms the plurality of local coordinates into a plurality of global coordinates of a global coordinate system corresponding to a vehicle position, and in the global coordinate system, the obstacle higher than the reference road plane and having a height greater than a threshold value is defined as a to-be-warned obstacle.

18. The obstacle warning apparatus for vehicle according to claim 10, wherein the receiver comprises a horizontal field of view, a vertical field of view, a tilt angle and a sweep angle, and the horizontal field of view is greater than 190 degrees, the vertical field of view is greater than 100 degrees, the tilt angle is toward a ground direction and in a range from 0 degrees to 90 degrees relative to a horizontal plane, and the sweep angle is toward outside of the vehicle and in a range from 0 degrees to 15 degrees.

19. The obstacle warning apparatus for vehicle according to claim 18, wherein the region of interest is an area with a length of 2 m and a width of 5 m, and a width direction is perpendicular to an optical axis of one of the plurality of camera modules, and the structured infrared light is projected on the region of interest to generate a plurality of light spots, a minimal array range of the plurality of light spots satisfies the conditions Dots=FOV/θ, and θ=S/R, wherein Dots is a number of the plurality of light spots located in a length direction or the width direction, FOV is the horizontal field of view or the vertical field of view of the receiver, θ is an included angle of one of the plurality of light spots relative to the projector, S is a distance of two adjacent light spots of the plurality of light spots projected in the region of interest, and R is a distance from one of the plurality of light spots to the projector.

20. An obstacle warning apparatus for vehicle, comprising:
a plurality of camera modules disposed on a head side, a door side and a rear side of the vehicle, respectively, and each of the plurality of camera modules comprising:
a projector configured to project a structured infrared light on a region of interest outside of the vehicle; and
a receiver configured to receive a first image and a second image generated by the visible light and the structured infrared light reflected from the region of interest, respectively;
a surround-view processor configured to receive the first image and generate surround-view data according to an image stitching and image blending algorithm;

an obstacle processor configured to receive the second image and generate obstacle data according to a deformed pattern generated by an obstacle on the region of interest on which the structured infrared light is projected, wherein the obstacle data comprises a height value from a top surface of the obstacle to a reference plane where the obstacle is located, and when the height value is greater than a threshold value, the obstacle processor generates prompt data; and an image synthesizer configured to receive the surround-view data and the obstacle data and generating a synthesized image according to the surround-view data and the obstacle data, and display the obstacle in the synthesized image by a plurality of levels or a contour-line image, according to the height value.

21. The obstacle warning apparatus for vehicle according to claim 20, wherein the distance between the projectors and the receiver is lower than 20 cm.

22. The obstacle warning apparatus for vehicle according to claim 20, wherein the receiver comprise at least one fisheye lens.

23. The obstacle warning apparatus for vehicle according to claim 20, wherein the image synthesizer generates a 3D geometry model according to the first images, the second images, and the local coordinate systems of the plurality of camera modules, and the 3D geometry model comprises a plurality of local coordinates of the local coordinate systems, and a plane having a maximal area in the 3D geometry model is defined as a reference road plane.

24. The obstacle warning apparatus for vehicle according to claim 23, wherein after the reference road plane is defined, the image synthesizer transforms a plurality of local coordinates into a plurality of global coordinates of a global coordinate system corresponding to a vehicle position, and in the global coordinate system, the obstacle higher than the reference road plane and having a height greater than 10 cm is defined as a to-be-warned obstacle.

25. The obstacle warning apparatus for vehicle according to claim 23, wherein after the reference road plane is defined, the image synthesizer transforms a plurality of local coordinate into a plurality of global coordinates of a global coordinate system corresponding to a vehicle position, and in the global coordinate system, the obstacle higher than the reference road plane and having a height greater than the 30 cm is defined as a to-be-warned obstacle.

* * * * *